United States Patent [19]
Laughlin et al.

[11] Patent Number: 6,165,533
[45] Date of Patent: *Dec. 26, 2000

[54] METHOD OF PREPARING DOUGH

[75] Inventors: Daniel L. Laughlin, White Bear Lake; Jimmy A. DeMars, Hugo; Gregory C. Vargas, White Bear Lake, all of Minn.

[73] Assignee: The Pillsbury Company, Minneapolis, Minn.

[*] Notice: This patent is subject to a terminal disclaimer.

[21] Appl. No.: 09/130,676

[22] Filed: Aug. 6, 1998

Related U.S. Application Data

[63] Continuation of application No. 08/723,919, Sep. 30, 1996, Pat. No. 5,855,945.

[51] Int. Cl.[7] .................................................. A21D 10/00
[52] U.S. Cl. ........................... 426/549; 426/94; 426/496; 426/551; 426/552; 426/553; 426/561; 426/562; 426/563
[58] Field of Search ..................................... 426/549, 551, 426/552, 561, 562, 563, 553, 94, 496

[56] References Cited

U.S. PATENT DOCUMENTS

| | | |
|---|---|---|
| 3,620,763 | 11/1971 | Hans . |
| 4,022,917 | 5/1977 | Selenke . |
| 4,381,315 | 4/1983 | Yong et al. . |
| 4,741,907 | 5/1988 | Furuhashi . |
| 4,792,456 | 12/1988 | Katz et al. . |
| 5,260,082 | 11/1993 | DelValle et al. . |
| 5,409,720 | 4/1995 | Kent et al. . |
| 5,451,417 | 9/1995 | Freyn et al. . |
| 5,855,945 | 1/1999 | Laughlin et al. ........................ 426/549 |

OTHER PUBLICATIONS

Hoseney, *Principles of Cereal Science and Technology, Second Edition*, published by the American Association of Cereal Chemists, Inc., St. Paul, Minnesota, pp. 221–251 (©1986, 1994 by the American Association of Cereal Chemists, Inc.).

Geankoplis, C., *Transport Processes and Unit Operations, 2d Ed.*, The Ohio State University, Allyn And Bacon, Inc., publ.; ©1983 (pp. 154–155, 159–161).

*Primary Examiner*—Gabrielle Brouillette
*Attorney, Agent, or Firm*—Merchant & Gould P.C.

[57] ABSTRACT

In a method of preparing a dough composition, a batter comprising water, a leavening agent, and flour is formed. After the batter is formed, a complementary leavening agent, additional flour and other minor ingredients are added to the batter and mixed to form a dough wherein the leavening agents are distributed uniformly through the dough and the dough results in a higher specific volume upon baking. A dough composition is also formulated from a batter, wherein the batter comprises water, a leavening agent and flour. After the batter is formed, a complementary leavening agent, additional flour, and any minor ingredients are added to the batter and mixed to form a dough. Alternatively, the complementary leavening agent can be added in an unreactive form to the batter as long as it does not react with the other leavening agent until the dough is formed. The dough comprises from about 30 wt-% to about 60 wt-% flour, from about 20 wt-% to about 40 wt-% water; from about 0.1 wt-% to about 2.0 wt-% leavening acid; and from about 0.1 wt-% to about 2.0 wt-% leavening base. The dough proofs uniformly and, once baked, provides a specific volume ranging from about 2 cc/gm to about 6 cc/gm.

8 Claims, 3 Drawing Sheets

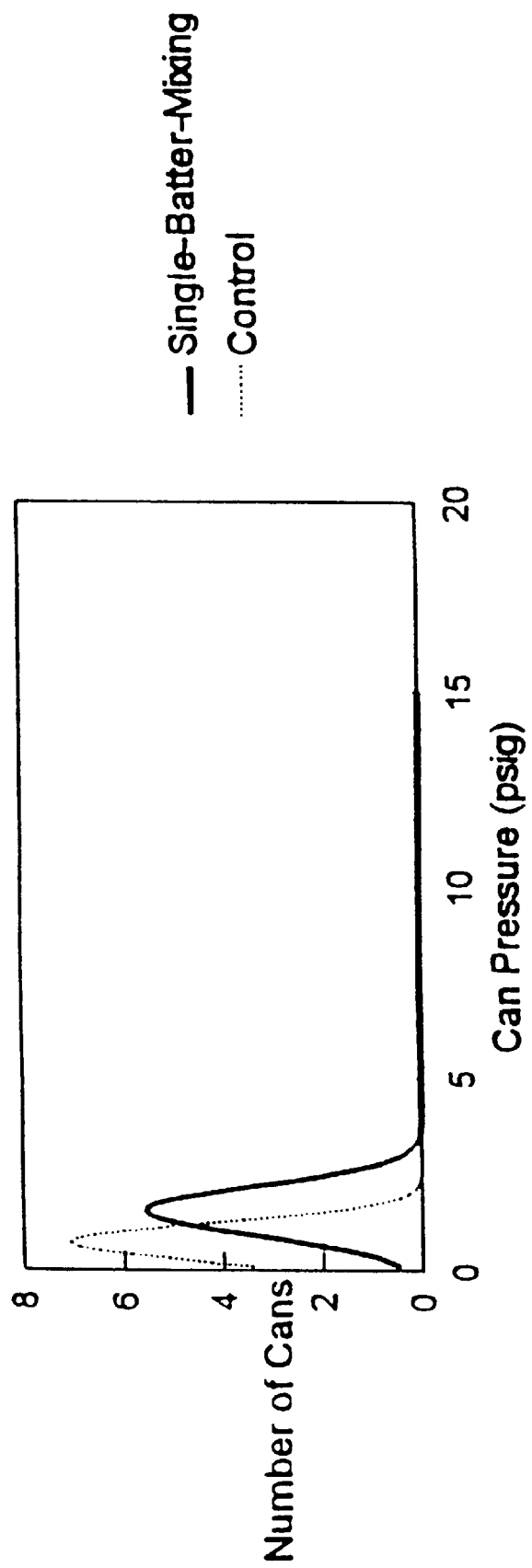

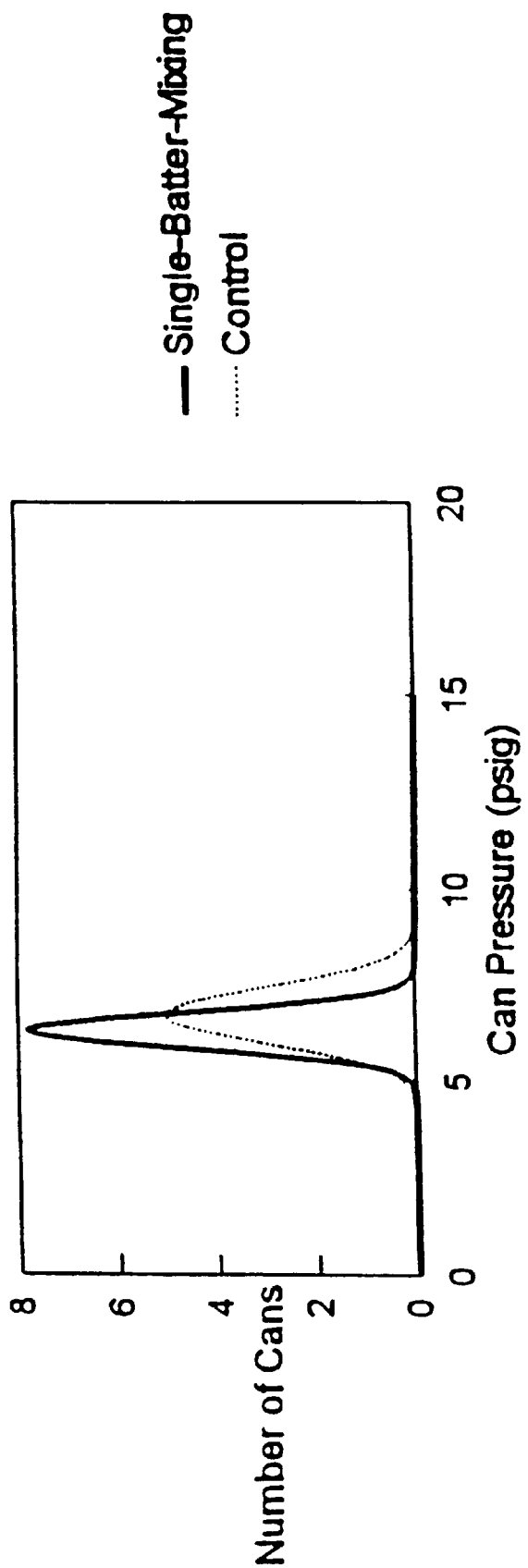

METHOD OF PREPARING DOUGH

This application is a Continuation of application Ser. No. 08/723,919, filed Sep. 30, 1996, now U.S. Pat. No. 5,855,945, which application is incorporated herein by reference.

FIELD OF THE INVENTION

This invention relates generally to a method of preparing dough. More particularly, this invention provides a method for making a dough leavened by an acid-alkali system wherein a batter containing one portion of the leavening system is formed and then the batter is combined with the other portion of the leavening system and the remaining dough ingredients to make a dough.

BACKGROUND OF THE INVENTION

In commercial baking, batters and doughs are often formulated by the hundreds, if not the thousands of pounds. As with any food product, doughs and the resulting baked goods have organoleptic properties which are based upon the dough formula, thorough mixing, uniform distribution of dough components, and uniformity of physical properties within the dough. Uneven or a lack of full mixing may affect taste, texture, and mouthfeel of the dough. Nonuniform dough mixing may also result in a variance in dough can pressure and, in turn, decreased shelf stability, and reduced performance of the eventual food product.

Another problem faced in the production or formulation of a dough is that the viscoelastic properties of the dough change as the dough continues to develop and build viscosity. Minor ingredients or constituents which are placed into the dough in smaller concentrations often have important roles in contributing organoleptic properties to the dough. However, these same constituents are often the most difficult to mix homogeneously within the developing dough.

For example, leavening is critical in refrigerated doughs. The type, quantity, and combination of leavening agent is tailored to each product to give optimum volume, texture, performance and quality.

Typically doughs are prepared by mixing flour, water and dough-developing agents in a first cycle. Minor ingredients, including leavening agents are added to the developing dough in a second cycle. The first cycle is generally intended to provide a peak viscosity and is generally the longest period in dough mixing. The development of a peak viscosity is important to the commercial production of large volumes of doughs and baked goods.

In order to maintain the efficiency of the dough formulation process, the second cycle takes place over a relatively shorter period of time. As a result, minor ingredients such as leaveners, flavors and nutrients may be mixed throughout the dough in a manner which is less than homogenous. As a result, the dough may have uneven concentrations of leavener dispersed throughout the dough matrix.

Problems which may occur when the dough ingredients are not thoroughly mixed include less than adequate proofing and low specific volumes in final baked goods. Commercial doughs are typically packaged, for example, in cans, so the lack of uniform mixing can result in some cans having too much leavening, and therefore an excessively high can pressure, and other cans having too little leavening, and therefore an excessively low can pressure. If the can pressure is too high, the cans might burst, leading to unusable product. If the can pressure is too low, the dough might not be shelf stable and might spoil because there was insufficient pressure to expel all of the oxygen from the can. A non-uniform distribution of ingredients might also result in non-uniform final products or a final product with a lower specific volume.

To insure the even distribution of ingredients within the dough, a manufacturer may have to extend the amount of time the ingredients are mixed. This can result in an increased production time, decreased output capacity and, therefore, decreased manufacturing efficiency. Longer mixing times may also cause the dough to attain a viscosity beyond its peak viscosity, adversely affecting the dough's viscoelastic properties.

Prior disclosures concerning dough formulations include U.S. Pat. No. 3,620,763 to Hans which is directed to a ready-to-bake refrigerator dough which exhibits stability against microbial growth. Hans teaches the addition of polysaccharide hydrophilic film formers to a dough to enhance storage stability. However, Hans does not disclose a method to enhance the uniformity of the ingredients within the dough.

U.S. Pat. No. 4,022,917 to Selenke teaches maintaining the premixed batter at an acidic pH of about 5 or less to inhibit microbial growth by isolating the acidified batter from the alkaline leavening ingredients of the mixture. To isolate the alkaline leavening agent from the acidified batter, the alkaline leavening agent is encapsulated within a water-insoluble coating that is meltable or heat-dispersible. The coating prevents the alkaline leavening agent from reacting with the acidic leavening agent in the batter until the batter is cooked. An acidic environment inhibits bacterial growth and can enhance the activity of some fungistatic agents. Selenke does not teach a method to enhance the uniformity of ingredients within a dough.

U.S. Pat. No. 5,409,720 to Kent et al. teaches a dough mix including a moist ingredient portion and a dry ingredient portion capable of being combined to produce a complete dough requiring no additional ingredients. The moist ingredient portion includes sugar, shortening and all water or moisture required in the complete dough. The dry ingredient portion includes all flour required in the complete dough and may include leavening agents, egg solids, candy pieces, nuts, dried fruits, coconuts and other dry or moisture-free ingredients. Kent is directed to a method for enhancing the shelf stability of a dough mix, not a method for enhancing the uniformity of ingredients within a dough.

None of these known methods insure that the dough product will have an adequately mixed leavening system. As a result, the products produced by the methods described above may not be uniform. Because it is important that manufacturers of dough products be able to make the products efficiently while producing the best product possible, there is a need for an inexpensive, efficient method of making dough that will result in a uniform product.

SUMMARY OF THE INVENTION

The invention relates to a method of preparing a dough composition. A first embodiment of the invention is a method of preparing a dough composition wherein water, leavening acid, flour and, optionally, minor ingredients are first combined to form an acid batter. The acid batter is then combined with other ingredients, including a leavening base, to form a dough.

A second embodiment of the invention is a method of preparing a dough composition wherein water, leavening base, flour and, optionally, minor ingredients are first combined to form a base batter. The base batter is then combined with other ingredients, including a leavening acid, to form a dough.

Since a batter is formed with either one of the leavening acid or leavening base, the method may be referred to as a "single-batter-mixing" method.

The dough composition of the invention is formulated from a batter which contains either a leavening acid or a leavening base. The batter comprises water, a leavening acid or a leavening base, and some of the dough ingredients. After the batter is mixed, the remaining ingredients, including the complementary leavening agent, are added to the batter and mixed to form a dough. As used herein, a "complementary" leavening agent can be either a leavening acid or leavening base, depending on the context. If the batter contains the leavening acid, the "complementary" leavening agent that is later added would be the leavening base. On the other hand, if the batter contains a leavening base, the "complementary" leavening agent would be the leavening acid.

In another embodiment of the invention, the batter is comprised of either a leavening acid or a leavening base, water, and the complementary leavening agent in a form which substantially prevents the leavening reaction from taking place until a dough is made from the batter. Preferably, the complementary leavening agent is encapsulated so that it does not react with the non-encapsulated leavening agent until a dough is prepared.

Typically, the dough comprises from about 30 wt-% to about 60 wt-% flour; from about 20 wt-% to 40 wt-% water; from about 0.1 wt-% to about 2.0 wt-% leavening acid; and from about 0.1 wt-% to about 2.0 wt-% leavening base.

The dough composition proofs in about 0 to about 90 minutes, more preferably in about 0 to about 60 minutes. The final baked product typically has a specific volume from about 2 cc/gm to about 6 cc/gm, more preferably from about 3 cc/gm to about 5 cc/gm.

The invention allows production of doughs which may afford faster proofing, and when packaged provide a narrower range of package pressures, and provide baked goods which have higher specific volumes. Further, by forming a batter containing only a leavening acid or leavening base, or a batter in which the complementary leavening agent is encapsulated the invention provides a method for formulating doughs which increases efficiency by up to 10% or more in a given time period.

The claimed invention is applicable to any number of dough compositions. Generally, the invention is applicable to any dough systems containing chemical leavening. Representative but not limiting dough products include biscuits, rolls, bread sticks, pizza crusts, and laminated pastries among other goods.

When a dough is made using the method of the invention, the leavening agents are mixed more uniformly throughout the dough. The uniform distribution of leavening agents can be observed by measuring dough can pressure distribution over time.

When leavened doughs are packaged in, for example, dough cans and then refrigerated, the leavening reaction continues to generate gas within the dough inside the can. Depending on the amount and distribution of the leavening agents, if the dough has sufficient leavening capacity, it desirably expands to fill the volume of the container. After the container volume is filled, and again, if the dough has sufficient leavening capacity, the dough desirably continues to expand to generate pressure within the container. The development of pressure inside the container is important to insure that all the oxygen has been expelled from the inside of the container, to seal the container from the inside, and to maintain the dough's delicate structure during storage. The amount and efficacy of the leavening agent in the dough, therefore, is important in providing desirable dough products.

If there is too high a concentration of leavening agents in the dough in a given can, the dough will expand too much and cause the can to burst.

If, on the other hand, the concentration of leavening agents in the dough in a given can is too low, the dough will not expand sufficiently to drive out all of the oxygen and seal the can. This permits the oxygen in the container to adversely interact with the dough, resulting in, among other things, gray dough and microbial growth. Therefore, it is important that each batch of dough be mixed to have a sufficiently uniform leavening concentration distributed throughout the dough matrix to achieve the desired level of dough expansion in each can.

As seen in the Figures, in conventionally prepared doughs, the leavening agents may not be distributed uniformly throughout the batch of dough, resulting in wide variations in the concentration of leavening agents in each can. Some of these cans will contain doughs that generate too much pressure, and some will contain doughs that do not generate sufficient pressure to provide the desired packaged dough product.

Doughs made using the method of the invention show a narrower can pressure distribution over time. This is achieved by more uniformly distributing the leavening agents in the batch of dough, so that the chances are greatly increased that the dough will have nearly the target leavening agent concentration in each can. In addition, the narrow can pressure distribution means that the overall leavening agent concentration in the dough can be tailored to the specific type of leavening agent used, giving the manufacturer a greater degree of control of the properties, including can pressures, of the manufactured product. Because the can pressure distribution is narrower, the number of cans with insufficient gas expansion or excessive gas expansion is reduced, resulting in fewer non-specification product losses and hence a greater efficiency for the entire manufacturing process.

The method of the invention also results in faster processing times because the ingredients are more easily combined and the dough may be proofed for a shorter period of time. Additionally, the method results in products with increased specific volume, increased bake height and a more uniform crumb texture.

According to the invention, most of the water in the recipe is used in the batter, while only a fraction of the flour is added to the batter. Because the batter contains a higher percentage of water than a typical dough formulation, the batter is less viscous. The reduced viscosity helps insure that the ingredients present in the batter, in particular, the leavening agent, are thoroughly mixed. Because the batter contains either the leavening base or leavening acid, the actual chemical leavening reaction cannot begin until the complementary leavening agent is added or is free to react with the other leavening agent. As a result, the leavening agent present in the batter can be thoroughly combined with the other minor ingredients present in the batter before physical or chemical exposure to the other leavening agent.

When the batter is subsequently combined with the complementary leavening agent and the flour, the leavening reaction occurs more rapidly than in conventional mixing and occurs uniformly throughout the dough. The reduced viscosity of the batter and the separation of the leavening agents both help insure that the ingredients in the dough are more thoroughly and more easily combined. As a result, dough mixing times and output capacity are improved and the final product has a more uniform texture and a higher specific volume.

BRIEF DESCRIPTION OF THE FIGURES

FIG. 1A is a histogram showing the 1 day can pressure of dough made by a single-batter-mixing method and a control dough made by conventional dough mixing procedures.

FIG. 1B is a histogram showing the 8 day can pressures of a dough made by a single-batter-mixing method and a control dough.

DETAILED DESCRIPTION OF THE INVENTION

Figure 1C:
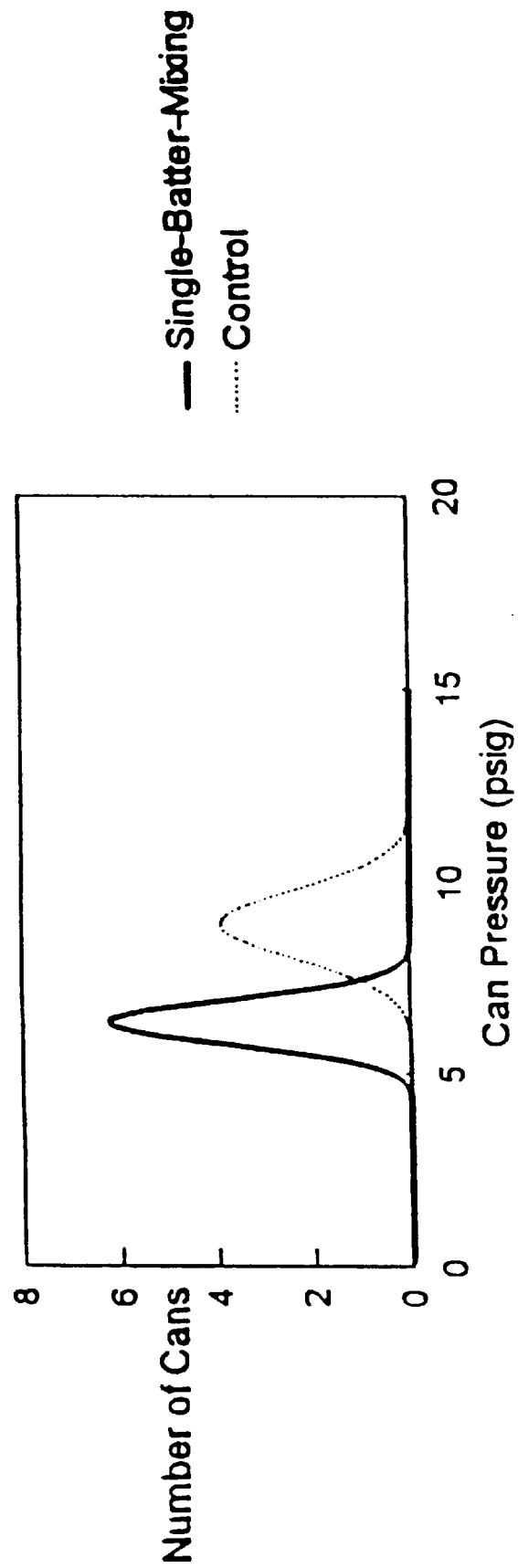
FIG. 1C is a histogram showing the 13 day can pressures of a dough made by a single-batter-mixing method and a control dough.

The invention is a dough composition made using a batter that contains either a leavening acid or a leavening base, most of the water in the recipe, and preferably some of the flour and minor ingredients. After the batter is mixed, the remaining ingredients, including the complementary leavening agent and the remaining flour, are added to the batter to form a dough. Alternatively, the complementary leavening agent can be added to the batter in a non-reactive form so that it does not react with the other leavening agent prior to forming the dough. A preferred non-reactive form is an encapsulated complementary leavening agent.

The single-batter-mixing procedure of the invention results in a dough in which minor ingredients, such as leavening agents, are nearly uniformly distributed throughout the dough. Consequently, the dough may be able to proof faster and provide baked goods which have a higher specific volume. Additionally, the dough, when packaged in, for example, cans, has a narrower range of can pressures at refrigeration temperature. As used with the invention "refrigeration temperature" means a temperature that is above the freezing point of water, but cool enough to reduce microbial growth. Typically, a "refrigeration temperature" is between about 35° F. and 45° F., more preferably between about 35° F. and 40° F.

In one embodiment, the batter contains a leavening acid, water, part of the flour and minor ingredients. After the batter is thoroughly mixed, the leavening base (the "complementary" leavening agent), the remaining flour and other remaining ingredients are added to the batter to form a dough. In another embodiment, the batter contains a leavening base, water, some of the flour and minor ingredients. After the batter is thoroughly mixed, the leavening acid (the "complementary" leavening agent), the remaining flour and other remaining ingredients are added to the batter to form a dough.

In another embodiment, the batter contains a leavening agent, water, part of the flour, and the complementary leavening agent in encapsulated form. After the batter is mixed, the remaining flour and other ingredients are added to make a dough.

Composition

The invention can be used to make a variety of refrigerated doughs including doughs for bread, such as French bread, wheat bread, white bread, corn bread, rolls, such as cinnamon rolls, dinner rolls, caramel rolls and other assorted baked goods such as breadsticks, croissants, pastries, biscuits, pizza dough, and the like. Additionally, the invention can be used to make non-refrigerated doughs, such as doughs that are immediately baked or doughs made from dry mixes wherein the dry ingredients for the batter are contained in a separate package from the "complementary" leavening agent, flour and remaining ingredients.

A. Flour

The dough of the invention contains a grain constituent that contributes to the structure of the dough. Different grain constituents lend different texture, taste and appearance to a baked good. Flour is a grain constituent that is frequently used in baked goods. Suitable flours include hard wheat flour, soft wheat flour, corn flour, high amylose flour, low amylose flour, and the like. For example, a dough product made with a hard wheat flour will have a more coarse texture than a dough made with a soft wheat flour due to the presence of a higher amount of gluten in hard wheat flour.

B. Leavening Agents

The doughs of the invention include chemical leavening agents that increase the volume and alter the texture of the final baked good. Chemical leavening typically involves the interaction of a leavening acid and sodium bicarbonate, a leavening base. The leavening acid triggers the release of carbon dioxide from bicarbonate upon contact with moisture. The carbon dioxide gas aerates a dough or batter during mixing and baking to provide a light, porous cell structure, fine grain, and a texture with desirable appearance and palatability.

The evolution of carbon dioxide essentially follows the stoichiometry of typical acid-base reaction. The amount of bicarbonate present determines the amount of carbon dioxide evolved, whereas the type of leavening acid affects the speed at which the carbon dioxide is liberated. The amount of leavening base used in combination with the leavening acid should be balanced such that a minimum of unchanged reactants remain in the finished product. An excess amount of leavening base can impart a bitter flavor to the final product while excess leavening acid can make the baked product tart.

Sodium bicarbonate, or baking soda, is a leavening base that is the primary source of carbon dioxide gas in many chemical leavening systems. This compound is stable and relatively inexpensive to produce. Other leavening bases include potassium bicarbonate, ammonium carbonate, and ammonium bicarbonate.

Leavening acids include sodium or calcium salts of ortho, pyro, and complex phosphoric acids in which at least two active hydrogen ions are attached to the molecule. Baking acids include monocalcium phosphate monohydrate (MCP), monocalcium phosphate anhydrous (AMCP), sodium acid pyrophosphate (SAPP), sodium aluminum phosphate (SALP), dicalcium phosphate dihydrate (DPD), dicalcium phosphate (DCP), sodium aluminum sulfate (SAS), glucono-delta-lactone (GDL), potassium hydrogen tartrate (cream of tartar) and the like.

If the complementary leavening agent is to be added to the batter in an encapsulated form, preferably the encapsulation material is selected such that it can withstand shear forces and temperature increases during formation of the batter, but will ultimately dissolve and release the leavening agent when the batter is used to form a dough. Suitable materials that can be used to encapsulate the leavening agent include fats, oils and waxes. Encapsulated baking soda is one example of an encapsulated leavening agent that suitable for use in the invention.

In addition to the chemical leavenings described above, the dough of the invention may also contain other leavening agents such as yeast.

C. Additional Ingredients

The dough of the invention may contain agents that modify the texture and other qualities of the dough or the finished product. Texture modifying agents can improve viscoelastic properties, plasticity, dough development, and the like. Examples of textural agents include fats, emulsifiers, hydrocolloids, and the like.

Fat is frequently added to a dough formulation as a shortening that entraps air during the creaming process. Consequently, shortening helps improve the volume, grain and texture of the final product. Shortening also has a tenderizing effect and improves overall palatability and flavor of a baked good. Either natural shortenings, animal or vegetable, or synthetic shortenings can be used.

Generally, shortening is comprised of triglycerides, fats and fatty oils made predominantly of triesters of glycerol with fatty acids. Fats and fatty oils useful in producing shortening include cotton seed oil, ground nut oil, soybean oil, sunflower oil, sesame oil, olive oil, corn oil, safflower oil, palm oil, palm kernel oil, coconut oil, and combinations thereof.

Emulsifiers are nonionic, anionic, and/or cationic surfactants that influence the texture and homogeneity of the dough mixture, increase dough stability and improve the eating quality of the finished product. Emulsifiers include lecithin, mono- and diglycerides of fatty acids, propylene glycol mono- and diesters of fatty acids, glyceryl-lacto esters of fatty acids, ethoxylated mono- and diglycerides, and the like.

Hydrocolloids are added to the dough formulation to increase moisture content, and to improve viscoelastic properties of the dough and crumb texture of the final product by stabilizing small air cells within the batter and by binding to moisture. Hydrocolloids include xanthan gum, guar gum, locust bean gum, and the like.

Dough-developing agents can also be added to the dough formulation to enhance the dough viscosity, texture and plasticity. Any number of dough-developing agents known to those of skill in the art may be used including azodicarbonamide, diacetyl tartaric acid ester of mono- and diglycerides (D.A.T.E.M), and potassium sorbate.

The doughs of the invention may also contain nutritional supplements such as vitamins, minerals, proteins, and the like. Examples of nutritional supplements include thiamin, riboflavin, niacin, iron, calcium, and mixtures thereof.

Flavorings such as sweeteners, spices and specific flavorings such as bread flavoring may also be used with the dough of the invention. Sweeteners include regular and high fructose corn syrup, sucrose (cane or beet sugar), dextrose, and the like. In addition to flavoring the baked good, sweeteners such as sugar increase the moisture retention of a baked good, thereby increasing its tenderness.

Doughs can also include preservatives and mold inhibitors such as sodium salts of propionic or sorbic acids, sodium diacetate, vinegar, monocalcium phosphate, lactic acid and mixtures thereof.

Doughs of the invention typically have the ingredients listed in Table I in the following amounts:

TABLE I

| Constituent | Dough (wt-%) Preferable | More Preferable |
|---|---|---|
| Flour | 30–60 | 35–55 |
| Water | 20–40 | 25–35 |
| Acid Leavener | 0.1–2.0 | 1.0–1.5 |
| Base Leavener | 0.1–2.0 | 0.75–1.5 |

Formulation

A. The Batter

In accordance with the invention, either the leavening acid or the leavening base is combined with water and preferably with flour and minor ingredients to create a batter. After the batter is mixed, the remaining ingredients, including the complementary leavening agent, flour and other minor ingredients are added to the batter to form a dough. In one embodiment, an "acid batter" is made that contains leavening acid, water and flour. After the acid batter is mixed, a leavening base, the remaining flour and other minor ingredients are added to the batter to make a dough. In a second embodiment, a "base batter" is made that contains leavening base, flour and water. After the base batter is mixed, a leavening acid, the remaining flour and other remaining ingredients are added to the batter to make a dough.

According to the invention, the batter contains either a leavening acid or a leavening base and a higher percentage of water than a typical dough formulation. Preferably, the batter contains from about 40 wt-% to about 95 wt-% water. More preferably, the batter contains from about 50 wt-% to about 70 wt-% water. Typically, the batter contains most of the water required in the dough formulation and less than half of the dry ingredients. In addition to water and a leavening agent, some of the flour required by the dough formulation can be added to the batter. Any of the minor ingredients required by the dough formulation (except for the complementary leavening agent, unless it is encapsulated or otherwise sequestered from reacting with the other leavening agent in the batter) can be added to the batter and the batter mixing method will still enhance the quality of the final product. Minor ingredients which are added to the batter should be selected such that they do not interfere with the leavening agents' ability to react with each other once combined in the dough.

Generally, the batter should have enough water present to result in a viscosity low enough such that the ingredients are easily combined, but high enough such that at least some of the air bubbles produced by mixing the batter are trapped within the batter composition. The amount of leavening agent present in the dough varies with the desired can pressure. However, there should be enough leavening to generate a sufficient package pressure to prevent gray dough, but not so much that the packages burst. Because the leavening agents are uniformly mixed according to the method of the invention, a lower amount of leavening may be added to the dough composition than in a typical dough formulation while obtaining similar desirable organoleptic qualities.

Although the batter formulation will vary depending on the baked good that is being made, typically the batter contains from about 40 wt-% to about 95 wt-% water, from about 10 wt-% to about 40 wt-% flour, from about 1 wt-% to about 7 wt-% leavening agent and from about 0 wt-% to about 10 wt-% of minor ingredients. More preferably, the batter contains from about 50 wt-% water to about 70 wt-% water, from about 15 wt-% to about 35 wt-% flour, and from about 2 wt-% to about 6 wt-% leavening agent.

The batter is preferably prepared by first combining water with ice to make an ice-water mixture. The leavening agent and minor ingredients can be added individually to the ice-water mixture, or the ingredients can be dry-mixed together first and then combined with the ice-water mixture. Upon mixing, the ice melts completely into the batter to form a uniform mixture. The purpose of the ice is to simply keep the batter temperature from increasing too much due to the work done on the batter. Other means of keeping the batter temperature from increasing too much, such as a cold water-jacketed mixing vessel or mixing the batter in a cold room, can be used.

If the dough is made in bulk, for example, during industrial production, it is preferred that the batter be mixed at a low temperature such that all ingredients, when combined to form a dough, are at a low temperature. It is also desirable that the dough be mixed at a low temperature to prevent the premature action of the leavening agents. If the leavening agents prematurely react during processing there might not be enough gas trapped within the dough to provide adequate expansion after the dough is canned to prevent gray dough. Preferably, the batter is mixed a temperature from about 25° F. to about 65° F. More preferably, the batter is mixed at a temperature from about 32° F. to about 45° F.

The batter should be mixed for a time effective to thoroughly combine the ingredients. Therefore, it is preferred that the batter is mixed for about 2 minutes to about 7 minutes, more preferably from about 3 minutes to about 6 minutes.

The time after the batter is mixed, and before the batter is combined with the remaining ingredients to make the dough, is preferably as short as possible within the constraints of the production facility. Typically, the hold time is from about 0 minutes to about 60 minutes, more preferably the hold time is from about 0 minutes to about 30 minutes. If the batter contains an encapsulated leavening agent, the hold time should preferably be from about 0 minutes to about 15 minutes.

The batter preferably has a low viscosity to facilitate the distribution of the ingredients within the batter. However, the batter should be thick enough to impede the rapid transfer of air and carbon dioxide bubbles out of the batter that are generated due to the action of the mixing or to the reaction of the leavening acid or leavening base with the other batter ingredients. Although the acid or base may react slightly with, for example, the water or flour used to make the batter, the degree of reaction and the amount of gas generated at this stage is very low. Most of the gas generated by an acid-base reaction occurs upon mixing the dough.

Preferably, the batter is as viscous as possible while still achieving the purpose of the invention. The viscosity of a batter varies as a function of temperature. Typically, the viscosity of the batter is from about 400 centipoise (cps) to about 1600 cps when the batter is mixed at a temperature from about 55° F. to about 70° F. More preferably the viscosity of the batter is from about 800 cps to about 1200 cps in this temperature range.

However, in a lower temperature range that is better suited for industrial purposes, the batter might have a different viscosity. In a preferred temperature range for bulk production between 32° F. and 45° F., it is preferred that the batter have a viscosity between about 500 cps and 2500 cps, more preferably, from about 1000 cps to about 2000 cps.

B. The Dough

After the batter is prepared and thoroughly mixed in a separate container, the batter is combined with flour and any remaining ingredients, including the complementary leavening agent if it was not added in an unreactive or encapsulated state during formation of the batter, during a single mix cycle to form a dough. Because one of the leavening agents has already been combined with some of the minor ingredients in the batter, the mix cycle can usually be shorter than conventional processes. When the batter is subsequently combined with the complementary leavening agent, flour and the remaining minor ingredients, the leavening reaction can take place uniformly throughout the entire dough. The mix cycle should last long enough to thoroughly combine the complementary leavening agent, flour and remaining minor ingredients with the batter and to insure the dough has the desired viscoelastic properties depending on how the dough will be subsequently processed and the type of product to be made with the dough. Generally, the longer the dough is mixed during the mix cycle, the more developed the viscoelasticity of the dough. The desired viscoelastic properties will vary depending on the dough processing and the dough product that is being made.

The viscoelastic properties of the dough can be measured by any number of methods that are known in the industry. The water content, temperature, and ingredients used to make the dough all affect the dough's viscoelastic properties. Typically, the most significant factor determining a target dough viscoelasticity is the type of product to be made with the dough. For example, the viscoelastic properties of a biscuit dough are different from the viscoelastic properties of a pastry dough.

One way of measuring viscoelastic properties of dough is with a Farinograph instrument, available from C.W. Brabender Company, South Hackensack, N.J. The Farinograph instrument measures a dough's resistance to mixing, which is measured in Brabender Units (B.U.). Doughs made in accordance with the invention preferably have Farinograph measurements within the ranges typical for doughs, between about 600 to 1200 B.U.

In the doughs of the invention, ingredients which may be added to the batter may affect the resulting dough's viscoelastic properties. For example, if a dough-developing agent is added to a base batter, the extensibility of the dough is increased because the dough-developing agent is in contact with the flour and water for a longer period of time than many of the other dough ingredients. Other ingredients, such as hard wheat flour which contains a high amount of gluten, may also affect the dough's extensibility due to the protein network formed by the gluten. The degree of gluten development in the batter will also, therefore, affect the dough's viscoelastic properties.

The flour/water ratio of the dough also varies depending on the dough product. Generally, the flour/water ratio is from about 1.50 to about 1.80.

Because the duration of the mix cycle generally affects the viscoelastic properties of the dough, it is preferable that the dough is mixed for about 5 minutes to about 18 minutes. More preferably, the dough is mixed for about 7 minutes to about 15 minutes. The temperature of the dough should be low enough that the leavening agents do not prematurely react, but not so low that no leavening reaction occurs or the dough is too difficult to process. If the leavening reaction is complete before the dough is canned, the dough may not generate sufficient can pressure to prevent gray dough. Because the temperature at which the dough is mixed may affect the leavening reaction, it is preferred that the dough is mixed at a temperature from about 50° F. to about 80° F., more preferably from about 60° F. to about 70° F.

Once the dough is made, it can be placed in a suitable container, such as a fiberboard composite can. The can containing the dough is closed, and the canned dough typically is then proofed. The leavening reaction is usually accelerated during proofing. However, as a result of the invention, the leavening agents are so well mixed and distributed that proofing may not be necessary to provide a suitable packaged dough product.

The proof time of a dough can affect the dough structure and can pressure of a canned, refrigerated dough and the bake height of a baked good. Therefore, it is preferred that the dough is proofed from about 0 minutes to about 90 minutes, more preferably, from about 0 minutes to about 60 minutes. The temperature at which the dough is proofed can also affect the rate of the leavening reaction. Therefore, it is preferred that the proofing is performed at a temperature from about 70° F. to about 110° F., more preferably, from about 80° F. to about 100° F.

According to the invention it is preferred that the dough mixture contain from about 20 wt-% to about 40 wt-% water, from about 30 wt-% to about 60 wt-% flour, from about 0.1 wt-% to about 2.0 wt-% leavening base and from about 0.1 wt-% to about 2.0 wt-% leavening acid. More preferably, the dough mixture contains from about 25 wt-% to about 35 wt-% water, from about 35 wt-% to about 55 wt-% flour, from about 0.75 wt-% to about 1.5 wt-% leavening base and from about 1.0 wt-% to about 1.5 wt-% leavening acid.

The method of the claimed invention results in a more uniform distribution of ingredients within the dough. Formation of a dough using a single-batter-mixing method of the invention, from batter formation through final mixing, can be accomplished in about 10 to 20 minutes. Additionally, the uniformity of ingredients within the dough formulation results in a narrower can-pressure distribution. The standard deviation for the can pressures is typically about two-thirds of that observed with conventional mixing.

After the dough is made, it is processed. Processing will vary depending on the final product. For example, processing for French pastry dough will be different than processing for biscuit dough. In industrial dough manufacture for refrigerated dough in cans, for example, the dough is generally formed into the desired shape and size. The dough is then placed into cans which are sealed and which may be proofed. The cans are then refrigerated and ready for sale.

C. Baked Goods

The method of the claimed invention results in a dough with uniformly distributed ingredients. Because the ingredients are more uniformly distributed, the resulting baked good has a higher specific volume, increased bake height and a more uniform crumb texture when compared to a baked good made by a conventional method. Although described herein as "baked products or goods", doughs of the invention can be made into finished products using other cooking methods such as frying, boiling, or microwaving.

Although the specific volume of the baked good varies depending on the type of baked good, the method of the invention results in a baked good with a specific volume from about 5 to about 10% greater than achieved by conventional mixing. More preferably, the specific volume is from about 2 cc/gm to about 6 cc/gm.

WORKING EXAMPLES

The following examples further illustrate, but do not limit, the invention.

Example 1

Two batches of dough were prepared: a control biscuit dough, and a single-batter-mixed biscuit dough.

| Biscuit Dough - Control Mixing | |
|---|---|
| Ingredient | Wt % |
| First Cycle Ingredients: | |
| Water & Ice | 28.64 |
| Shortening | 2.00 |
| Flour | 45.14 |
| Minor/Added Ingredients | 3.81 |
| Second Cycle Ingredients: | |
| SAPP and SALP | 1.26 |
| Sodium Bicarbonate | 0.95 |
| Salt | 1.2 |
| Sugar | 3.0 |
| Shortening Chips | 14.0 |
| Total | 100.00 |

1st Mix Cycle

An ice-water mixture was made. The flour and some of the minor ingredients were dry-mixed by hand and then poured into the mixer. Melted shortening was stirred into the ice water by hand and then poured into the mixer. The ingredients were mixed for a total mixing time of about 4 minutes.

2nd Mix Cycle

The leaveners, including sodium aluminum pyrophosphate (SAPP) and sodium aluminum phosphate (SALP), sodium bicarbonate, sugar, and salt were dry-mixed by hand in a vessel. The mix was cut into the dough in the mixer by mixing it with fist-sized pieces of dough. Then shortening chips were added to the mixture. The mixer was run for about 4 minutes.

The dough was removed from the mixer and placed in a dough trough. The dough temperature was about 74° F. The flour/water ratio was 1.58.

Biscuit Dough—Single-Batter-Mixing

A single-batter-mixed batch of biscuits was prepared in which a leavening acid batter was prepared before making the dough. The sodium bicarbonate was added late in the dough preparation.

| Ingredient | Wt % |
|---|---|
| Batter Ingredients: | |
| Water & Ice | 28.64 |
| SAPP and SALP | 1.26 |
| Sugar | 3.00 |
| Salt | 1.2 |
| Shortening | 2.00 |
| Flour | 9.03 |
| Minor Ingredients | 3.81 |
| Mix Cycle Ingredients: | |
| Flour | 36.11 |
| Shortening Chips | 14.0 |
| Sodium Bicarbonate | 0.95 |
| Total | 100.00 |

Batter Preparation

An ice water solution was prepared. The first amount of flour was added to the solution. At this point, some of the minor ingredients were added. Sodium acid pyrophosphate, sodium aluminum phosphate, sugar and other minor ingredients were dry-mixed together by hand and then added to the ice-water mixture. Melted shortening was then added to the mixer. The batter was mixed for a total of about 5 minutes. The temperature of the acid batter was 60° F.

Mix Cycle

The hold-time for the batter was approximately 8 minutes before preparing the dough. To prepare the dough, the batter was poured over flour, sodium bicarbonate, and shortening chips in the mixer. The mixer was run for 10 minutes to mix the dough (the "mixing time"). The dough was then removed from the mixer and placed in the dough trough. The dough temperature was 69° F. The flour/water ratio was 1.58.

Dough Cutting and Canning

The dough from the control batch and the single-batter-mixed batch was formed, canned and proofed. Once sealed, the cans were proofed for 60 minutes. The proofed cans were placed in the refrigerator.

After 24 hours, the single-batter-mixed dough containers had can pressures from 1–3 psig. The control dough containers had can pressures from 0–2 psig. FIG. 1A depicts the distribution of can pressures measured after 1 day. After 8 days, the can pressures increased for dough prepared by both methods. The control dough exhibited the largest pressure increase. FIG. 1B shows the distribution of can pressures measured after 8 days. After 13 days, the control dough cans had an average pressure of 8.87 psig with a standard deviation of +/−0.93 psig. After 13 days, the single-batter-mixed dough cans had an average pressure of 6.31 psig with a standard deviation of +/−0.58 psig. FIG. 1C shows the distribution of can pressures measured after 13 days.

As seen in FIGS. 1A–1C, the cans of single-batter-mixed dough developed their pressure in a shorter time compared to the control dough. After 13 days, the single-batter-mixed dough can pressures are only 3–4 psig higher than they were after 24 hours, whereas the control dough can pressures increase by up to 9 psig. These different rates of developing can pressures are consistent with leavening reaction kinetics. In the single-batter-mixed dough, half of the reagents are already in solution and are well mixed. As a result, the leavening reaction in the single-batter-mixed dough proceeds rapidly.

In the control dough, the leavening agents are not entirely in solution as the dough is made. As a result, mass-transfer rates and rates of dissolution of the leavening reagents limit the rate of can-pressure generation in the control dough. This is consistent with the hypothesis that the control dough is not as well-mixed, and that leavening ingredients in the control dough are the least dissolved.

FIGS. 1A–C show that the single-batter-mixed dough cans have a narrower can-pressure distribution than the control dough cans. A narrow can-pressure distribution indicates that the ingredients, especially the leavening agents, are more uniformly distributed throughout the dough.

Example 2

Two batches of dough were prepared: a control biscuit dough, and a single-batter-mixed biscuit dough. The ingredients and method were substantially the same as in Example 1 above, except that the mixing time for the single-batter-mixed dough was 7.5 minutes, and the proofing times for both doughs was 45 minutes.

Specific volume measurements were made on ten biscuits baked from dough taken from more than one can from each of the single-batter-mixed dough and the control dough batches.

|  | Single-Batter-Mixed Biscuits | Control Biscuits |
| --- | --- | --- |
| Specific Volume (cc/g) (average of 10 biscuits) | 3.23 ± 0.07 | 2.94 ± 0.007 |

As indicated in the table above, the specific volumes for biscuits made from the single-batter-mixed dough were greater than those made from the control dough despite the fact that the single-batter-mixed doughs had significantly lower can pressures. The crumb texture of the batter-mixed products was also more uniform than that of the control biscuits. These results are consistent with better distribution of leavening and other minor ingredients throughout the dough in the single-batter-mixing process.

The above specification, examples and data provide a complete description of the invention. Since many embodiments of the invention are possible without departing from the spirit and scope of the invention, the invention resides in the claims hereinafter appended.

What is claimed is:

1. A method of preparing a dough composition, said method comprising the steps of:
   (a) forming a batter comprising water, flour, a leavening agent, and an encapsulated complementary leavening agent; and
   (b) combining said batter with additional ingredients comprising flour to formulate a dough;
   wherein said encapsulated complementary leavening agent does not react with the leavening agent until the dough is formulated.

2. The method of claim 1, wherein the leavening agent is a leavening acid and the encapsulated complementary leavening agent is a leavening base.

3. The method of claim 1, wherein the leavening agent is a leavening base and the encapsulated complementary leavening agent is a leavening acid.

4. The method of claim 2, wherein the leavening acid is selected from the group consisting of sodium aluminum phosphate, sodium acid pyrophosphate, glucono-delta-lactone, monocalcium phosphate anhydrous, monocalcium phosphate monohydrate, dicalcium phosphate dihydrate, dicalcium phosphate, sodium aluminum sulfate, potassium hydrogen tartrate, and combinations thereof.

5. The method of claim 3, wherein the leavening acid is selected from the group consisting of sodium aluminum phosphate, sodium acid pyrophosphate, glucono-delta-lactone, monocalcium phosphate anhydrous, monocalcium phosphate monohydrate, dicalcium phosphate dihydrate, dicalcium phosphate, sodium aluminum sulfate, potassium hydrogen tartrate, and combinations thereof.

6. The method of claim 2, wherein the leavening base is selected from the group consisting of sodium bicarbonate, encapsulated sodium bicarbonate, potassium bicarbonate, ammonium bicarbonate, ammonium carbonate, and mixtures thereof.

7. The method of claim 3, wherein the leavening base is selected from the group consisting of sodium bicarbonate, encapsulated sodium bicarbonate, potassium bicarbonate, ammonium bicarbonate, ammonium carbonate, and mixtures thereof.

8. The method of claim 1, wherein additional ingredients further comprise ingredients selected from the group consisting of a flavoring, a dough-developing agent, an emulsifier, a nutrient, a preservative, a shortening, a hydrocolloid, a salt, a sugar, and mixtures thereof.

* * * * *

UNITED STATES PATENT AND TRADEMARK OFFICE
CERTIFICATE OF CORRECTION

PATENT NO. : 6,165,533
DATED : December 26, 2000
INVENTOR(S) : Laughlin et al.

It is certified that error appears in the above-identified patent and that said Letters Patent is hereby corrected as shown below:

Column 14,
Line 38, "claim 2" should read -- claim 3 --
Line 45, "claim 3" should read -- claim 2 --
Line 52, "claim 2" should read -- claim 3 --
Line 57, "claim 3" should read -- claim 2 --

Signed and Sealed this

Fourteenth Day of May, 2002

Attest:

JAMES E. ROGAN
Attesting Officer   Director of the United States Patent and Trademark Office